Feb. 15, 1955
B. F. GUSTAFSON
2,702,018
SEED TREATING MACHINE
Filed Jan. 7, 1952
6 Sheets—Sheet 1
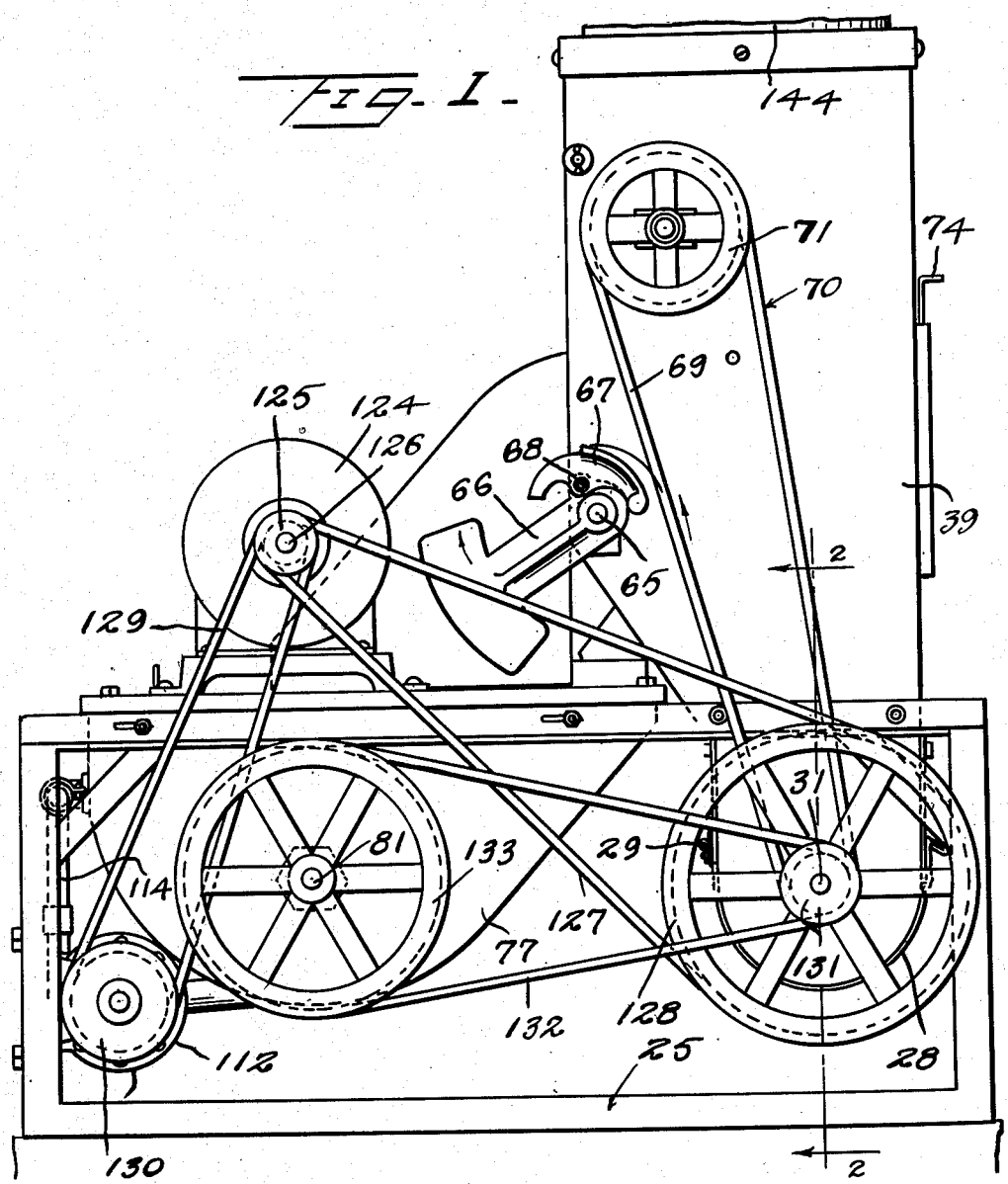
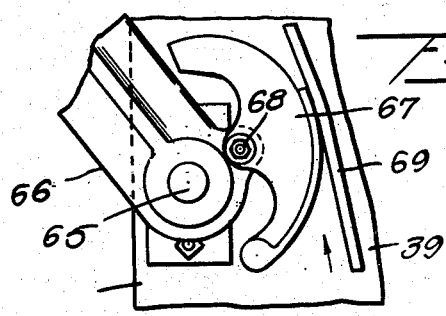
INVENTOR
B. F. Gustafson
BY Kimmel & Crowell
ATTORNEYS

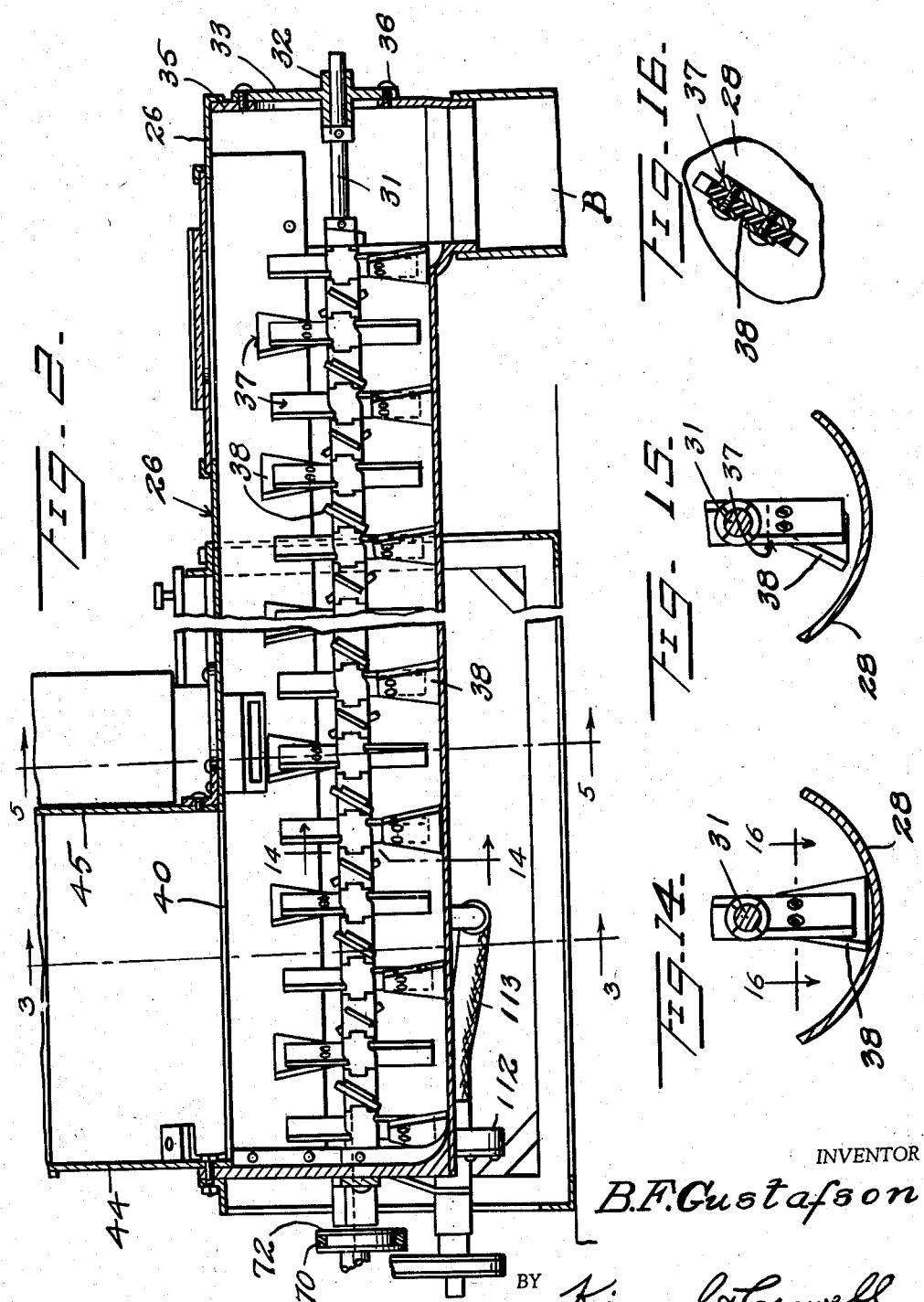

Feb. 15, 1955  B. F. GUSTAFSON  2,702,018
SEED TREATING MACHINE
Filed Jan. 7, 1952  6 Sheets-Sheet 3
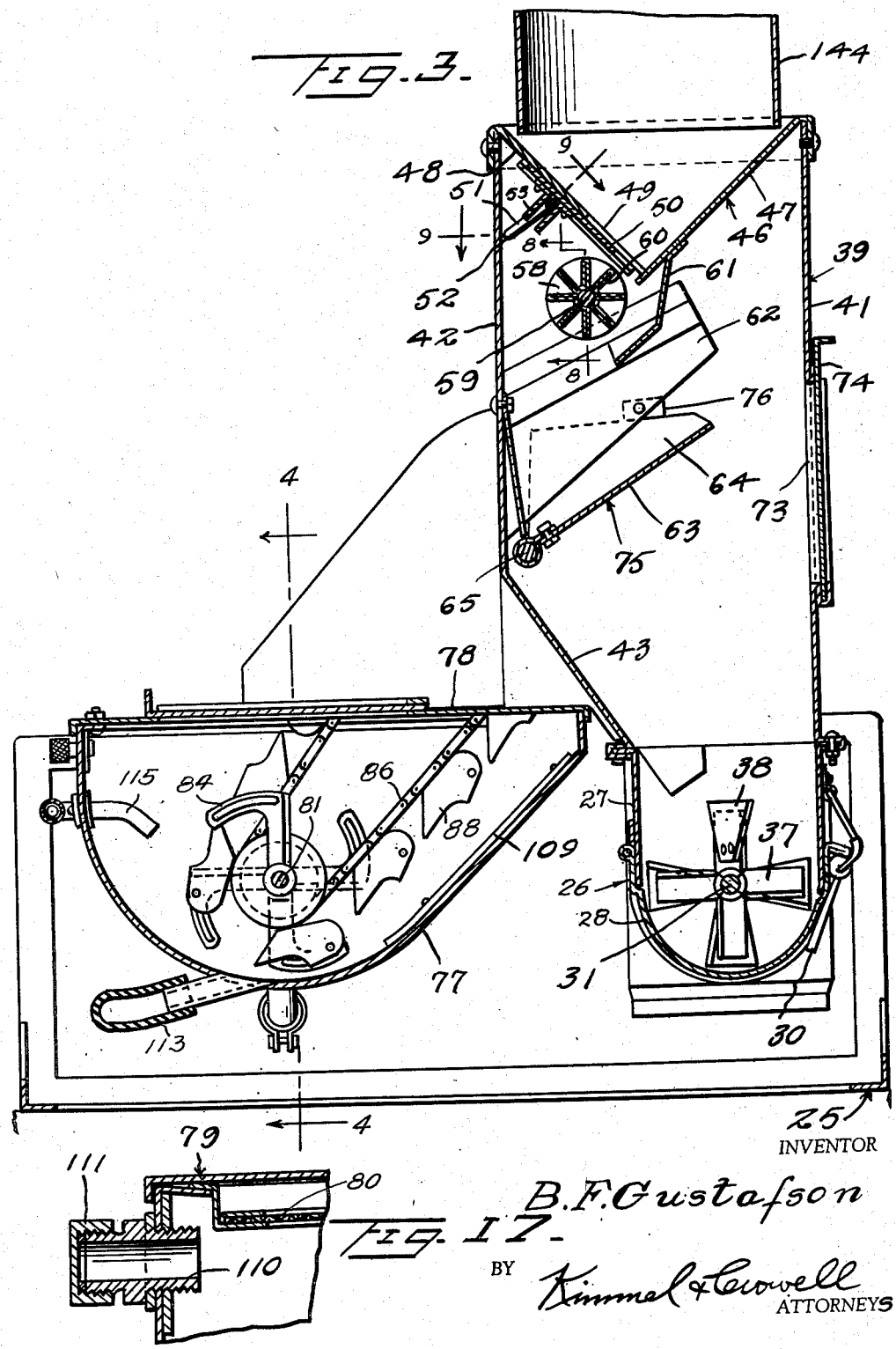
INVENTOR
B. F. Gustafson
BY Kimmel & Crowell
ATTORNEYS

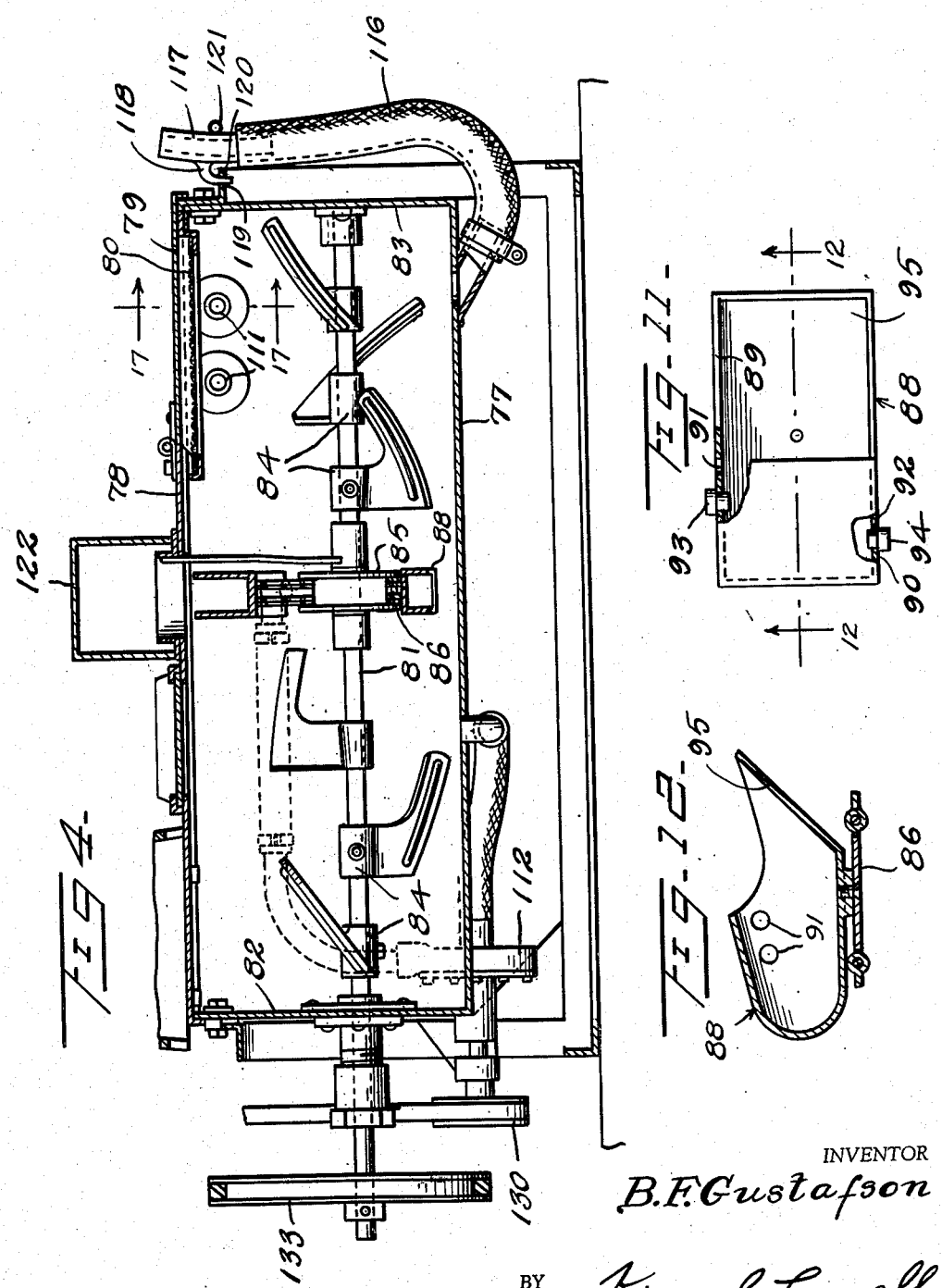

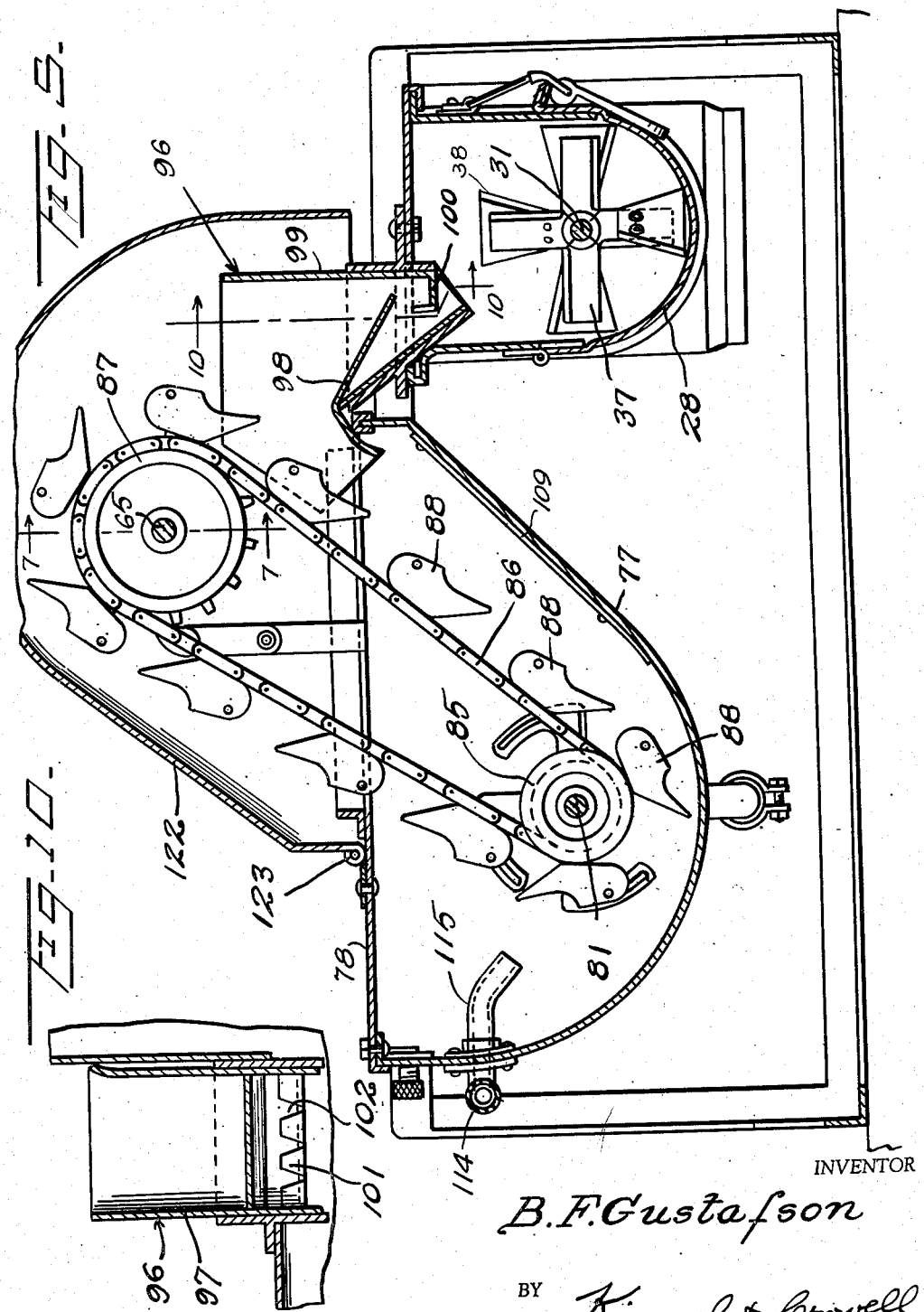

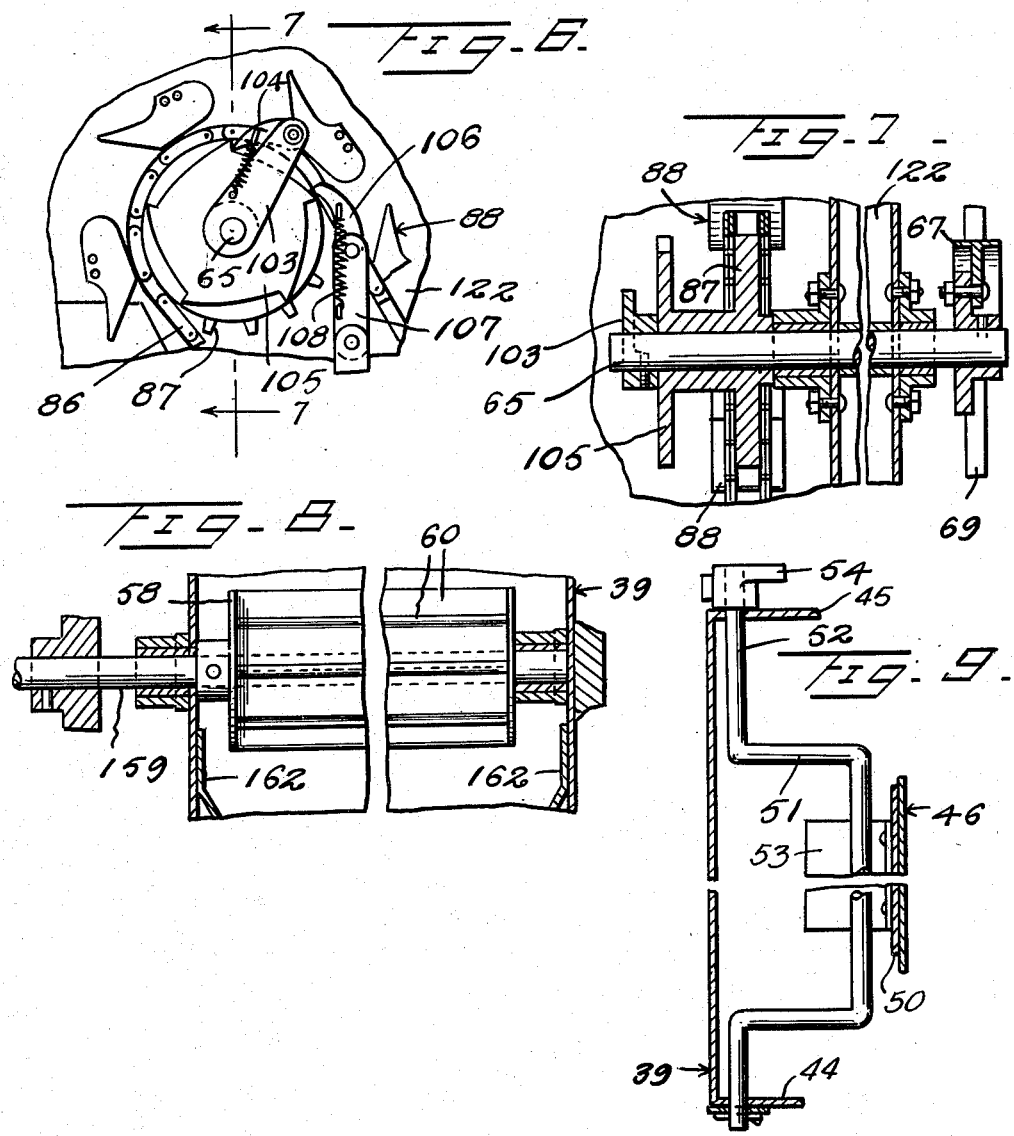

United States Patent Office 2,702,018
Patented Feb. 15, 1955

2,702,018

SEED TREATING MACHINE

Benjamin F. Gustafson, Fargo, N. Dak.

Application January 7, 1952, Serial No. 265,313

4 Claims. (Cl. 118—417)

This invention relates to seed treating machines and is an improvement over the construction shown in my prior Patent No. 2,519,649 issued August 22, 1950, for Seed Treating Machine.

An object of this invention is to provide a seed treating machine which is constructed and arranged to provide for the use of a liquid insecticide.

Another object of this invention is to provide a seed treating machine for use with a liquid insecticide which can easily and quickly be adjusted to treat grain, cotton, or garden seed.

A further object of this invention is to provide in a seed treating machine, an improved periodic feeding means for feeding seed to a mixing conveyor and for feeding liquid insecticide to the conveyor.

A further object of this invention is to provide an improved conveyor which will move the seed and insecticide lengthwise of the machine while simultaneously mixing the seed with the insecticide.

A further object of this invention is to provide in a seed treating machine an improved feeding means for the insecticide so that selected small quantities of the insecticide may be discharged into the conveyor in accordance with the seed being treated.

A further object of this invention is to provide in a machine of this kind a circulating pump for holding the insecticide in suspension and for flushing and filling the insecticide tank.

A further object of this invention is to provide in a seed treating machine an improved conveyor wherein alternate blades have rubber squeegees secured thereto so as to wipe the bottom of the conveyor housing.

A further object of this invention is to provide in a machine of this kind an improved bag holder and clamp for holding a bag open at the delivering end of the machine.

With the above and other objects in view, my invention consists in the arrangement, combination and details of construction disclosed in the drawings and specification, and then more particularly pointed out in the appended claims.

In the drawings:

Figure 1 is a detailed end elevation of a seed treating machine constructed according to an embodiment of this invention.

Figure 2 is a fragmentary longitudinal section taken on the line 2—2 of Figure 1.

Figure 3 is a sectional view taken on the line 3—3 of Figure 2.

Figure 4 is a sectional view taken on the line 4—4 of Figure 3.

Figure 5 is a fragmentary sectional view taken on the line 5—5 of Figure 2.

Figure 6 is a fragmentary side view of the liquid conveyor.

Figure 7 is a fragmentary sectional view taken on the line 7—7 of Figures 5 and 6.

Figure 8 is a fragmentary sectional view taken on the line 8—8 of Figure 3.

Figure 9 is a fragmentary sectional view taken on the line 9—9 of Figure 3.

Figure 10 is a fragmentary sectional view taken on the line 10—10 of Figure 5.

Figure 11 is a plan view partly broken away and in section of one of the liquid insecticide cups.

Figure 12 is a sectional view taken on the line 12—12 of Figure 11.

Figure 13 is a fragmentary side elevation of the seed valve dropping mechanism.

Figure 14 is a fragmentary sectional view taken on the line 14—14 of Figure 2.

Figure 15 is a fragmentary sectional view similar to Figure 14 showing the rubber blade members in flexed seed moving position.

Figure 16 is a fragmentary sectional view taken on the line 16—16 of Figure 14.

Figure 17 is a fragmentary sectional view taken on the line 17—17 of Figure 4.

Referring to the drawings, the numeral 25 designates generally a frame structure which is preferably formed out of angle iron or the like.

The frame 25 has mounted therein a horizontally disposed conveyor housing 26 which includes an upper stationary housing section 27 and a lower hinged transversely arcuate housing section 28. The lower housing section 28 is hinged along its inner edge to the upper housing section 27, and a plurality of latch bolts 30 carried by the upper housing section 27 are adapted to releasably latch the lower housing section 28 in operative position. A horizontally disposed conveyor shaft 31 is journalled lengthwise through the conveyor housing 26, and the forward end of shaft 31 is journalled in a bearing 32 carried by a bearing plate 33, which is removably secured to the end wall 35 of housing 26 by fastening devices 36.

The conveyor shaft 31 has fixed thereto a plurality of spaced conveyor blades 37, and each conveyor blade member 37 is formed of a pair of blades, one of which has fixed thereto a rubber wiper blade 38. The blade 38 extends beyond the adjacent outer end of blade 37, and in the normal position of blade member 38, the latter is adapted to wipe over the interior surface of the arcuate bottom section 28. When seed is being moved along the length of conveyor housing 26, the rubber blades 38 will flex, as shown in Figure 20, and will thereby be held out of contact with the inner surface of the conveyor section 28. In this manner during the normal use of the conveyor when seed is being conveyed thereby, the outer ends of the rubber blades 38 will not be worn off by contact with the surface of the arcuate housing section 28. However, when shaft 31 is rotated without any seed in the housing 26, such as for cleaning of the latter, blades 38 will wipe and clean the inner surface of the housing section 28.

A vertically disposed seed hopper 39 rises from the rear end of conveyor housing 26 and communicates with the intake opening 40 in the top of the conveyor housing 26. The hopper 39 is formed of a vertical front wall 41, a vertical rear wall 42 terminating at its lower end in a downwardly and outwardly inclined wall 43. The hopper 39 is also formed of a side wall 44 and a second side wall 45. A V-shaped combined seed guide and feeding means generally indicated at 46 is mounted on the upper end of the hopper 39 and is formed of downwardly convergent walls 47 and 48.

Wall 48 is formed with an opening 49 through which seed is adapted to drop and a flat valve plate 50 is adapted to be moved across the opening 49 by means of a U-shaped crank member 51, which includes a crank shaft 52 rockably carried by the side walls 44 and 45. The valve plate 50 has projecting downwardly therefrom a pair of parallel ears 53 between which the crank member 51 loosely engages. The forward end of crank shaft 52 has secured thereto a lever or arm 54 which is movable across an arcuate scale 55 fixed to the adjacent side wall 45. The arm or lever 54 is locked in adjusted position relative to the scale 55 by means of a locking bolt 56 engaging in an arcuate slot 57 formed in the scale plate 55.

A seed feeding wheel 58 is fixed to a shaft 59 journalled between the side walls 44 and 45 and is formed of a plurality of radially disposed blades 60, between pairs of which the seed dropping through the opening 49 are adapted to engage. A downwardly and inwardly inclined baffle or guide 61 is fixed to the wall 47 extending below the feeding wheel 58, and the seed contacting with the guide or baffle 61 is adapted to slide into a stationary receptacle 62 fixed to wall 42 and formed with an opening in the bottom thereof. The receptacle 62 has a pivoted bottom wall 63 formed with sides 64, and wall 63 is fixed to a shaft 65 journalled between the side walls 44 and 45.

Weighted lever 66 is fixed to the rear end of shaft 65, and lever 66 also has secured thereto a friction shoe 67. The shoe 67 is pivotally mounted on a pivot 68, and shoe 67, upon upward rocking of weighted lever 66, is adapted to contact the adjacent upwardly moving run 69 of an endless belt 70 whereby lever 66 will be quickly returned to receptacle raising position. The belt 70 is trained about a feeding wheel pulley 71 which is fixed to the rear end of shaft 59, and belt 70 is also trained about a small pulley 72 which is fixed to the conveyor shaft 31.

When the receptacle 62 is substantially filled with seed, bottom wall 63, which also forms a chute, will swing downwardly raising weighted lever 66 upwardly and the seed will drop downwardly into the conveyor housing 26. The front wall 41 of hopper 39 is formed with an opening 73 which is closed by a vertically slidable closure plate 74. The opening 73 is provided so that if desired, plate 74 may be raised upwardly during the operation of the machine in order that the user may view the dumping of the seed by the combined chute and receptacle bottom 63—64. The sides 64 of the seed chute generally designated as 75 are adapted to engage rubber bumpers 76, which are fixed to the inner faces of the side walls 44 and 45 of hopper 39.

In order to provide a means whereby the seed which is delivered to the intake end of the conveyor housing 26 may be coated or treated with an insecticide which, in the present instance, is a liquid insecticide, I have provided a liquid reservoir 77 which is carried by the frame 25 at one side of the conveyor housing 26 forwardly of the seed hopper 39. The reservoir 77 is formed with a horizontal top wall 78, and wall 78 has secured thereto a hinged closure 79. A screen 80 is removably carried by the wall 78 below the closure 79 so that when liquid insecticide is poured into the reservoir 77, the insecticide will be strained by the screen 80.

A shaft 81 is journalled between the end walls 82 and 83 of reservoir 77, and shaft 81 has fixed thereto a plurality of agitator blades 84. A sprocket or wheel 85 is loose on shaft 81, and an elevator chain 86 engages about sprocket 85. An upper sprocket 87 is loosely and rotatably mounted on shaft 65, and chain 86 is trained about sprocket 87. A plurality of buckets or cups 88 are fixed to elevator chain 86 at spaced intervals therealong, and each bucket or cup 88 is formed of a pair of side walls 89 and 90 having differently spaced apart openings 91 and 92, respectively. Selected ones of the openings 91 and 92 are adapted to be closed by means of rubber plugs 93 and 94. The openings 91 and 92 are provided so that a predetermined amount of liquid insecticide will be elevated when the cups 88 are moved upwardly after dipping into the reservoir 77. Each cup 88, as shown in Figure 15, is formed with an obtusely inclined wall 95 adapted to direct the liquid downwardly and forwardly into a removable receiver 96.

The receiver 96 is formed of opposite side walls 97 and a downwardly and forwardly inclined hook-shaped bottom wall 98. The bottom wall 98 has the lower or forward end thereof spaced from the front or forward wall 99 of receiver 96, and the lower end of the front wall 99 is formed with a right angularly disposed bottom wall 100. The bottom wall 100, which is spaced below the forward and lower end of bottom wall 98, is formed with an upwardly extending inner wall 101 which is provided with a plurality of spaced slots 102 adapted to retard the flow of the insecticide from the receiver 96 into the conveyor housing 26.

Sprocket 87 is adapted to be rotated by means of a pawl carrier 103, which is fixed on shaft 65. A spring-pressed pawl 104 is pivotally carried by arm 103 and is adapted to engage a ratchet wheel 105, which is fixed to sprocket wheel 87. A holding dog or pawl 106 is pivotally carried by an upstanding supporting arm 107 fixed to the frame 25, and pawl 106 is constantly urged to ratchet engaging position by means of a spring 108.

The reservoir 77 has secured to the inner side thereof a liquid gage 109 so that when the concentrated insecticide in liquid form is discharged into the reservoir 77, the correct amount of water may be discharged into the reservoir through one or the other of a pair of intake nipples 110, which are normally closed by means of a cap 111, as shown in Figure 22. In order to maintain the chemical or insecticide in suspension within the reservoir 77, a pump 112 has the intake side thereof connected by means of a pipe or hose 113 to the bottom of the reservoir 77. The discharge side of the pump 112 is connected by means of a pipe or hose 114 to an obtusely angled delivery nozzle 115 carried by the reservoir 77 and projecting thereinto in line with the elevator cups 88. The liquid discharged from the nozzle 115 is adapted to clean out the elevator cups and also to assure that each cup is properly filled. In other words, the force of the liquid discharged from nozzle 115 will clean out any sediment collecting within the elevator cups 88, and as these cups move upwardly and away from the nozzle 115, the liquid discharged from the nozzle 115 will fill the elevator cup to the desired degree which is determined by the position or positions of the plugs 93 and 94.

The reservoir 77 is adapted to be drained by means of a drain hose 116 which is connected at one end to the bottom of the reservoir, and the outer end of the hose 116 has a nozzle 117 secured thereto. The nozzle 117 is formed with a hook 118 adapted to engage in an opening 119 formed in a horizontal ledge 120 at the forward end of the reservoir 77. A coil spring 121 is fixed at each end to ledge 120 extending across the forward edge of ledge 120 and adapted to bind nozzle 117 in inoperative position, as shown in Figure 4.

An elevator cover or guard 122 is mounted about the upper projecting portion of the insecticide elevator being hinged as at 123 to the top wall 78 of reservoir 77. A power member 124 is mounted on the frame 25 adjacent the rear end thereof, and power member 124 has a multiple grooved pulley 125 fixed to the drive shaft 126 thereof. A belt 127 extends from pulley 125 and engages about a large grooved pulley 128 fixed on conveyor shaft 31. A belt 129 also engages about pulley 125 and about a pump pulley 130. Conveyor shaft 31 has mounted thereon a small grooved pulley 131 about which a belt 132 engages, and belt 132 engages about a large grooved pulley 133 fixed to agitator shaft 81.

A dual delivery member 134 is secured to the forward end of the conveyor housing 26, and a weighted damper or valve 135 is carried by the delivery member 134 so as to regulate the discharge of treated seed to either branch of the delivery member. Each branch 136 of the delivery member is provided with a flange or angle member 137 which is adapted to engage within the mouth of a bag B. The bag B is firmly secured to the delivery branch 136 by means of a clamping device which is formed, as shown in Figure 17, of a pair of upwardly curved ears 138 having a rubber washer 139 fixed therebetween. A bag clamping lever 140 is pivotally secured between a pair of ears 141 carried by a base plate 142, which is fixed to the outer wall of branch 136. Lever 140 has fixed thereto or formed integral therewith a clamping cam lobe 143 which, in the locking or clamping position of lever 140, is adapted to be disposed inwardly of the rubber ring 139, as shown in Figure 17.

In the use and operation of this machine, the seed is adapted to be discharged into the upper end of hopper 39 from a second hopper positioned above the hopper 39 and formed with a delivery tube 144. A valve plate 50 is regulated to the desired position depending on the kind of seed which is to be treated. The elevator cups 88 also have the plugs 93 and 94 adjusted to provide for the desired quantity of insecticide to be delivered by each cup. When power member 124 is operated, conveyor shaft 31 will rotate and feeding wheel 58 will be rotated. When the receptacle 62 is substantially filled so that the delivery chute 75 will be overbalanced, the seed in receptacle 62 will be dropped downwardly into the receiving end of conveyor housing 26. As shaft 65 is rocked clockwise, elevator wheel 87 is partially rotated so as to cause at least one of the elevator cups or buckets 88 to drop the liquid insecticide into the receiver 96. The receiver 96 is adapted to gradually discharge the insecticide into the conveyor housing 26 or forwardly of hopper 39 so that the initially dry seed which is received in housing 26 will have the insecticide coated thereon and as conveyor shaft rotates, the seed will be moved along the housing 26 and mixed thoroughly with the insecticide. The coated seed is then discharged from the forward end of housing 26 into a bag B which is carried by the bag holder or delivery member 134. While conveyor shaft 31 is being rotated, agitator shaft 81 will also be rotated so as to agitate the liquid insecticide in reservoir 77. Pump 112 will also provide for a thorough circulation of the insecticide in addition to providing for the combining cleaning out and filling of the elevator cups 88.

The seed treating machine hereinbefore described will thoroughly treat grain, cotton seed and garden seeds with an insecticide so as to provide for a better fertilization for the seed when the latter is placed in the ground.

I do not mean to confine myself to the exact details of construction herein disclosed, but claim all variations falling within the purview of the appended claims.

What is claimed is:

1. A seed treating machine comprising a frame, a conveyor housing carried by said frame, a conveyor rotatable in said housing, said conveyor comprising a shaft, a plurality of pairs of conveyor blades on said shaft, flexible rubber blade tips carried by certain ones of said pairs of blades, said tips being movable when seed is moved by said first-mentioned blades, but engageable with the wall of said housing for cleaning purposes when the housing is empty, means discharging seed into one end of said housing, said means comprising a receptacle, a delivery chute communicating therewith, a seed feeding wheel between said receptacle and said chute, a tiltable bottom wall in said chute, an axle for said bottom, and a counterweight carried by said axle whereby a predetermined weight of said seed tilts said bottom wall, means comprising an endless chain and cups carried thereby for discharging insecticide into said housing said last-mentioned means including a reservoir for insecticide, an axle in said reservoir, a second axle in said chute, sprockets carried by each axle, an endless chain around said sprockets, and a plurality of tiltable cups for lifting said insecticide from said reservoir to said chute, said insecticide discharging means including means for supplying a measured quantity of insecticide in each cup for discharge into said housing.

2. A seed treating machine comprising a frame, a horizontal conveyor housing carried by said frame, a rotatable conveyor in said housing, means discharging seed into one end of said housing, said conveyor including a plurality of seed moving blades of a length less than the diameter of said housing, and flexible tips on certain of said blades normally extending into engagement with the wall of said housing for cleaning purposes, but movable from said wall by the passage of seed through said housing to prevent wear of said tips.

3. A seed treating machine comprising a frame, a horizontal conveyor housing carried by said frame, a rotatable conveyor in said housing, means discharging seed into one end of said housing, said means including a hopper, a receptacle below said hopper, a rock shaft, a receptacle bottom wall fixed to said shaft, a weighted lever fixed to said shaft constantly urging said shaft to rotate in a direction to maintain said bottom wall in raised position, an upper conveyor sprocket loose on said shaft, a lower conveyor shaft, a sprocket on said lower shaft, a conveyor chain trained about said sprockets, buckets fixed to said chain, a toothed ratchet fixed to said upper sprocket, an arm fixed to said rock shaft, a pawl pivoted to said arm and engaging said ratchet, downward swinging of said bottom wall partially rotating said rock shaft and arm whereby said pawl will progressively and intermittently move said conveyor chain, an insecticide reservoir in which said chain and buckets engage, and a receiver adjacent said hopper communicating with said housing and disposed in a position to receive the insecticide from said buckets, said receiver including means for retarding the flow of insecticide to said housing.

4. A seed treating machine comprising a frame, a horizontal conveyor housing carried by said frame, a rotatable conveyor in said housing, means discharging seed into one end of said housing, said means including a hopper, a receptacle below said hopper, a seed feeding wheel between said hopper and said receptacle, a grooved pulley fixed relative to said wheel, a second pulley fixed relative to said conveyor, a belt about said pulleys, a rock shaft, a receptacle bottom wall fixed to said shaft, a weighted lever fixed to said shaft constantly urging said shaft to rotate in a direction to maintain said bottom wall in raised position, an upper conveyor sprocket loose on said shaft, a lower conveyor shaft, a sprocket on said lower shaft, a conveyor chain trained about said sprockets, buckets fixed to said chain, a toothed ratchet fixed to said upper sprocket, an arm fixed to said rock shaft, a pawl pivoted to said arm and engaging said ratchet, downward swinging of said bottom wall partially rotating said rock shaft and arm whereby said pawl will progressively and intermittently move said conveyor chain, an insecticide reservoir in which said chain and buckets engage, a receiver adjacent said hopper communicating with said housing and disposed in a position to receive the insecticide from said buckets, said receiver including means for retarding the flow of insecticide to said housing, and a friction shoe carried by said weighted lever engageable with an adjacent upwardly moving run of said belt upon upward swinging of said lever whereby to limit the upward swinging of said lever and effect quick downward swinging of said lever with upward swinging of said bottom wall to closed position.

References Cited in the file of this patent

UNITED STATES PATENTS

| Number | Name | Date |
|---|---|---|
| 1,550,656 | Anderson et al. | Aug. 25, 1925 |
| 1,573,142 | Calkins | Feb. 16, 1926 |
| 1,698,436 | Hendrickson | Jan. 8, 1929 |
| 1,739,642 | Light | Dec. 17, 1929 |
| 1,934,073 | Knox | Nov. 7, 1933 |
| 2,487,533 | Eastman | Nov. 8, 1949 |
| 2,519,649 | Gustafson | Aug. 22, 1950 |